United States Patent
Cho et al.

(10) Patent No.: US 8,218,495 B2
(45) Date of Patent: Jul. 10, 2012

(54) APPARATUS AND METHOD FOR CIRCUIT MODE RESOURCE ALLOCATION IN BROADBAND WIRELESS ACCESS (BWA) SYSTEM

(75) Inventors: Jae-Hee Cho, Seoul (KR); Min-Hee Cho, Suwon-si (KR); Hyun-Kyung Kim, Suwon-si (KR); Jae-Woo So, Bucheon-si (KR); Kwan-Hee Roh, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 932 days.

(21) Appl. No.: 12/175,229

(22) Filed: Jul. 17, 2008

(65) Prior Publication Data

US 2009/0022111 A1    Jan. 22, 2009

(30) Foreign Application Priority Data

Jul. 19, 2007    (KR) .................. 10-2007-0072146

(51) Int. Cl.
*H04W 4/00* (2009.01)
(52) U.S. Cl. .................. 370/330; 370/437; 370/468
(58) Field of Classification Search .................. None
See application file for complete search history.

(56) References Cited

U.S. PATENT DOCUMENTS

| | | | |
|---|---|---|---|
| 2005/0117536 A1* | 6/2005 | Cho et al. | 370/328 |
| 2007/0086370 A1* | 4/2007 | Jang et al. | 370/318 |
| 2007/0140167 A1* | 6/2007 | Jang et al. | 370/329 |
| 2007/0189214 A1* | 8/2007 | Hyon et al. | 370/329 |
| 2007/0230412 A1* | 10/2007 | McBeath et al. | 370/338 |
| 2007/0274288 A1* | 11/2007 | Smith et al. | 370/351 |
| 2008/0004029 A1* | 1/2008 | Moilanen | 455/450 |
| 2008/0009294 A1* | 1/2008 | Cho et al. | 455/451 |
| 2008/0025247 A1* | 1/2008 | McBeath et al. | 370/321 |
| 2008/0062944 A1* | 3/2008 | Smith et al. | 370/342 |
| 2009/0022098 A1* | 1/2009 | Novak et al. | 370/329 |

FOREIGN PATENT DOCUMENTS

| | | |
|---|---|---|
| KR | 102003007489 | 9/2003 |
| KR | 1020080111660 | 12/2008 |
| WO | WO 2007/018406 | 2/2007 |
| WO | WO 2007/045101 | 4/2007 |

* cited by examiner

*Primary Examiner* — Bob Phunkulh
(74) *Attorney, Agent, or Firm* — The Farrell Law Firm, P.C.

(57) ABSTRACT

An apparatus and method for circuit mode resource allocation in a Broadband Wireless Access (BWA) system is disclosed. The method includes generating a first resource allocation message which comprises currently used slot bitmap information with respect to a circuit mode region in a frame; allocating resources to one or more terminals with respect to currently unused slots in the circuit mode region according to the currently used slot bitmap information; and generating a second resource allocation message which comprises information relating to the resource allocation. Thus, the effective circuit mode resource allocation can be achieved without holes in the circuit mode, while maintaining backward compatibility with the existing standards.

48 Claims, 5 Drawing Sheets

APPARATUS AND METHOD FOR CIRCUIT MODE RESOURCE ALLOCATION IN BROADBAND WIRELESS ACCESS (BWA) SYSTEM

PRIORITY

This application claims priority under 35 U.S.C. §119(a) to a Korean patent application filed in the Korean Intellectual Property Office on Jul. 19, 2007 and assigned Serial No. 2007-72146, the entire disclosure of which is hereby incorporated by reference.

BACKGROUND OF THE INVENTION

1. Field of the Invention

The present invention relates generally to a Broadband Wireless Access (BWA) system. More particularly, the present invention relates to an apparatus and a method for circuit mode resource allocation.

2. Description of the Related Art

A Broadband Wireless Access (BWA) system based on an Orthogonal Frequency Division Multiplexing (OFDM) allocates resources to a user for transmission and reception of DownLink (DL) packets and UpLink (UL) packets, and informs the user of the resource allocation using a resource allocation message (DL/UL-MAP Information Element (IE) of Institute of Electrical and Electronics Engineers (IEEE) 802.16e. In a service which periodically transmits packets, e.g., Voice over Internet Protocol (VoIP) service, when a base station allocates the resources constantly using the resource allocation message, it may cause unnecessary resource waste. To avoid this problem, by using a circuit mode, the base station can allocate a fixed radio resource of a frame for a mobile station having the service of the periodic traffic. Herein, contrary to the circuit mode, a packet mode allocates resources constantly using the resource allocation message. Even without a separate resource allocation message, the mobile station allocated the radio resource in the circuit mode that can fixedly occupy the resource until the radio resource is changed or the allocated radio resource is released. Since the resource allocation message is not needed in every frame, overhead due to the resource allocation message can be reduced.

Meanwhile, the conventional circuit mode resource allocation has two shortcomings.

First, the Downlink (DL) of the IEEE 802.16e adopts a two-dimensional (2D) allocation scheme, whereas the circuit mode uses a one-dimensional (1D) allocation scheme, which does not ensure backward compatibility with existing standards.

Second, since the circuit mode resource allocation is not continuous and is subject to holes, the entire radio resource may not be efficiently utilized. For instance, in the resource allocation, when a hole generated from the circuit mode resource deallocation is less than a region required for the resource allocation, it is impossible to allocate the resource in the hole. While the hole can be allocated in the packet mode, packets need to be divided when the hole is less than the required region, which requires an additional resource allocation message. As such, the conventional method cannot achieve the efficient resource allocation in the circuit mode resource allocation and deallocation.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for a circuit mode resource allocation in a Broadband Wireless Access (BWA) system.

Another aspect of the present invention is to provide an apparatus and a method for maintaining backward compatibility with existing standards and efficiently allocating circuit mode resources without a hole in a circuit mode, in a BWA system.

The above aspects are achieved by providing a method for periodic resource allocation of a base station in a BWA system. The method includes generating a first resource allocation message which comprises currently used slot bitmap information with respect to a circuit mode region in a frame; allocating resources to one or more terminals with respect to currently unused slots in the circuit mode region according to the currently used slot bitmap information; and generating a second resource allocation message which comprises information relating to the resource allocation. The currently used slot bitmap information indicates whether each slot in the circuit mode region is used or not.

According to one aspect of the present invention, a method for periodic resource allocation to a terminal in a BWA system includes receiving a first resource allocation message which comprises a currently used slot bitmap information of a circuit mode region in a frame; receiving a second resource allocation message which comprises resource allocation information; and locating a resource allocated to the terminal using the currently used slot bitmap information and the resource allocation information only with respect to currently unused slots in the circuit mode region. The currently used slot bitmap information indicates whether each slot in the circuit mode region is used or not.

According to another aspect of the present invention, an apparatus for a periodic resource allocation of a base station in a BWA system includes a scheduler for allocating resources to one or more terminals only with respect to currently unused slots in a circuit mode region according to currently used slot bitmap information of the circuit mode region in a frame; and a MAP generator for generating a first resource allocation message which comprises the currently used slot bitmap information and a second resource allocation message which comprises information relating to the resource allocation. The currently used slot bitmap information indicates whether each slot in the circuit mode region is used or not.

According to yet another aspect of the present invention, an apparatus for periodic resource allocation to a terminal in a BWA system includes a Radio Frequency (RF) receiver for converting a signal received via an antenna to a baseband signal; a physical layer decoder for converting the signal output from the RF receiver in a physical layer; and a MAP analyzer for receiving a first resource allocation message which comprises a currently used slot bitmap information of a circuit mode region in a frame, and a second resource allocation message which comprises resource allocation information through the physical layer decoder, and locating a resource allocated to the terminal using the currently used slot bitmap information and the resource allocation information only with respect to currently unused slots in the circuit mode region. The currently used slot bitmap information indicates whether each slot in the circuit mode region is used or not.

Other aspects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

The above and other aspects, features and advantages of the preferred embodiments the present invention will become more apparent from the following detailed description taken in conjunction with the accompanying drawings, in which.

DETAILED DESCRIPTION OF PREFERRED EMBODIMENTS

Figure 1:
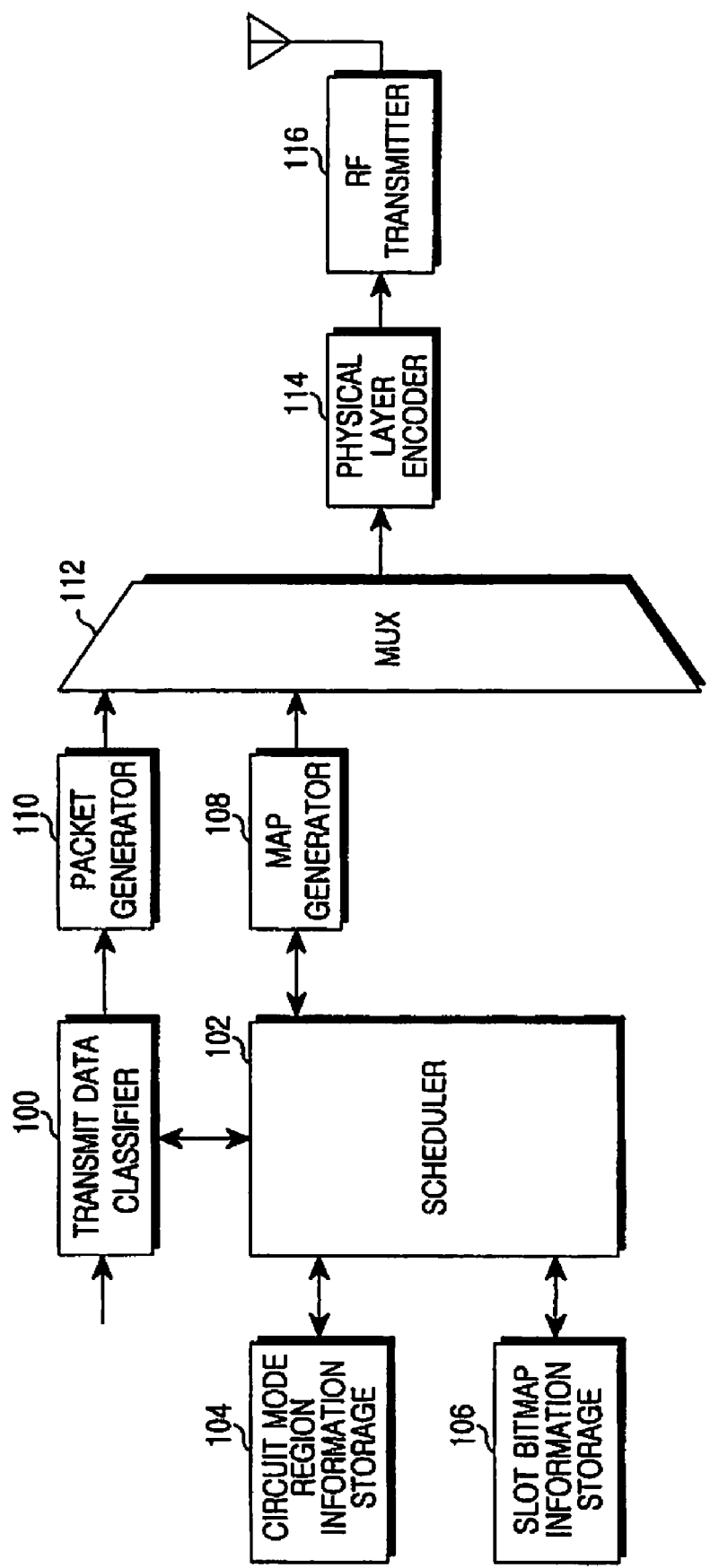
FIG. 1 is a block diagram of a base station in a BWA system according to a preferred embodiment of the present invention.

The following description with reference to the accompanying drawings is provided to assist in a comprehensive understanding of the preferred embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides an apparatus and a method for a circuit mode resource allocation in a Broadband Wireless Access (BWA) system. To address the shortcomings of the conventional resource allocation in a circuit mode, the present invention defines as follows.

In a DownLink (DL), the current standard transmits packets using a two-dimensional (2D) allocation scheme. Exceptionally, a Hybrid Automatic Repeat reQuest (HARQ) packet, which is a sub-packet in the 2D allocated region, can be allocated in 1D. Likewise, the DL circuit mode packet ensures backward compatibility with the existing standards by allocating in one dimension the circuit mode packets as sub-packets in the entire circuit mode region allocated in 2D. As such, using the circuit mode 2D region, the positions of the regions are clarified. Hence, not only the backward slot allocation but also the forward slot allocation is possible depending on the basis of the slot start offset. In this preferred embodiment of the present invention, focus is on the backward slot allocation from the end of the region.

Herein, there can be a plurality of the circuit mode 2D regions, and each region is properly operated according to the characteristics of the circuit mode packet in the corresponding region. The entire region of the allocated circuit mode packets is represented in 2D, and a circuit mode resource allocation message informing a terminal in a circuit mode of this region is provided. The circuit mode resource allocation message includes a control message relating to circuit mode 2D region information and DL circuit mode packets allocated to the corresponding region. The message should be broadcast periodically or in every frame so that every terminal operating in the circuit mode can receive the message.

In an UpLink (UL), since the current standard adopts the 1D allocation scheme, the backward compatibility in the circuit mode is guaranteed. Yet, to send a control message for the UL circuit mode packets, a circuit mode resource allocation message for the UL is also used.

A used slot bitmap is used to indicate whether each slot is occupied. That is, the used slot bitmap indicates whether the current slot in the circuit mode region is used, using bitmap. The used slot bitmap is included in the circuit mode resource allocation message and used for the terminal to make a circuit mode connection.

FIG. 1 is a block diagram of a base station in a BWA system according to a preferred embodiment of the present invention. The base station includes a transmit data classifier 100, a scheduler 102, a circuit mode region information storage 104, a slot bitmap information storage 106, a MAP generator 108, a packet generator 110, a multiplexer (MUX) 112, a physical layer encoder 114, and a Radio Frequency (RF) transmitter 116.

The transmit data classifier 100 classifies and buffers transmit data or service packets based on their type.

The scheduler 102 schedules the data output from the transmit data classifier 100 and outputs the scheduling result to the MAP generator 108. To schedule the periodic transmit data, the scheduler 102 extracts information relating to the entire circuit mode 2D region to which the DL circuit mode packets can be allocated, from the circuit mode region information storage 104, and determines the circuit mode 2D region for the DL circuit mode packets of the current frame. The scheduler 102 also extracts the used slot bitmap of the corresponding period with respect to the determined circuit mode 2D region, from the slot bitmap information storage 106, and allocates the resource for the DL circuit mode packets. The scheduler 102 extracts the used slot bitmap of the corresponding period with respect to the UL circuit mode region from the slot bitmap information storage 106 and allocates the resource for the UL circuit mode packets. That is, the scheduler 102 may allocate an unused slot to the terminal, deallocate the periodic resource which was allocated to the terminal, or continue to allocate the resource which was allocated to the terminal.

The circuit mode region information storage 104 stores information relating to the entire circuit mode 2D region to which the DL circuit mode packets can be allocated.

The slot bitmap information storage 106 stores the used slot bitmap of the corresponding period with respect to the circuit mode region. Herein, the used slot bitmap indicates whether the current slot is used in the entire circuit mode region using the bitmap.

The MAP_generator 108 generates MAP including the circuit mode resource allocation message for the circuit mode packets carried in the circuit mode region according to the scheduling result of the scheduler 102. The circuit mode resource allocation message includes at least one of the circuit mode 2D region information, the UL/DL used slot bitmap information, and the UL/DL circuit mode resource allocation and deallocation information. Wherein, the MAP means resource allocation information to indicate data burst transmitted in the current frame.

The packet generator 110 generates packets with the transmit data output from the transmit data classifier 100.

The MUX 112 selects and outputs the packets fed from the MAP generator 108 and the packet generator 110 according to a preset rule. For instance, the MUX 112 may select the output of the MAP generator 108 at the start of the frame, and may select the packets from the packet generator 110 in the DL interval.

The physical layer encoder 114 generates and outputs a preamble signal carried in the head of the frame. Next, the physical layer encoder 114 encodes the packets output from the MUX 112 in the physical layer. Herein, the physical layer encoder 114 may include a channel coding block, a modulating block, and so on. In an Orthogonal Frequency Division Multiplexing (OFDM) system, the channel coding block includes a channel encoder, an interleaver, a modulator, and so forth. The modulating block may include an Inverse Fast Fourier Transform (IFFT) operator for loading the transmit data to a plurality of orthogonal subcarriers.

The RF transmitter 116 converts the baseband digital signal output from the physical layer encoder 114 to an analog signal, further converts the baseband analog signal to an RF signal, and transmits the RF signal over an antenna.

Figure 2:
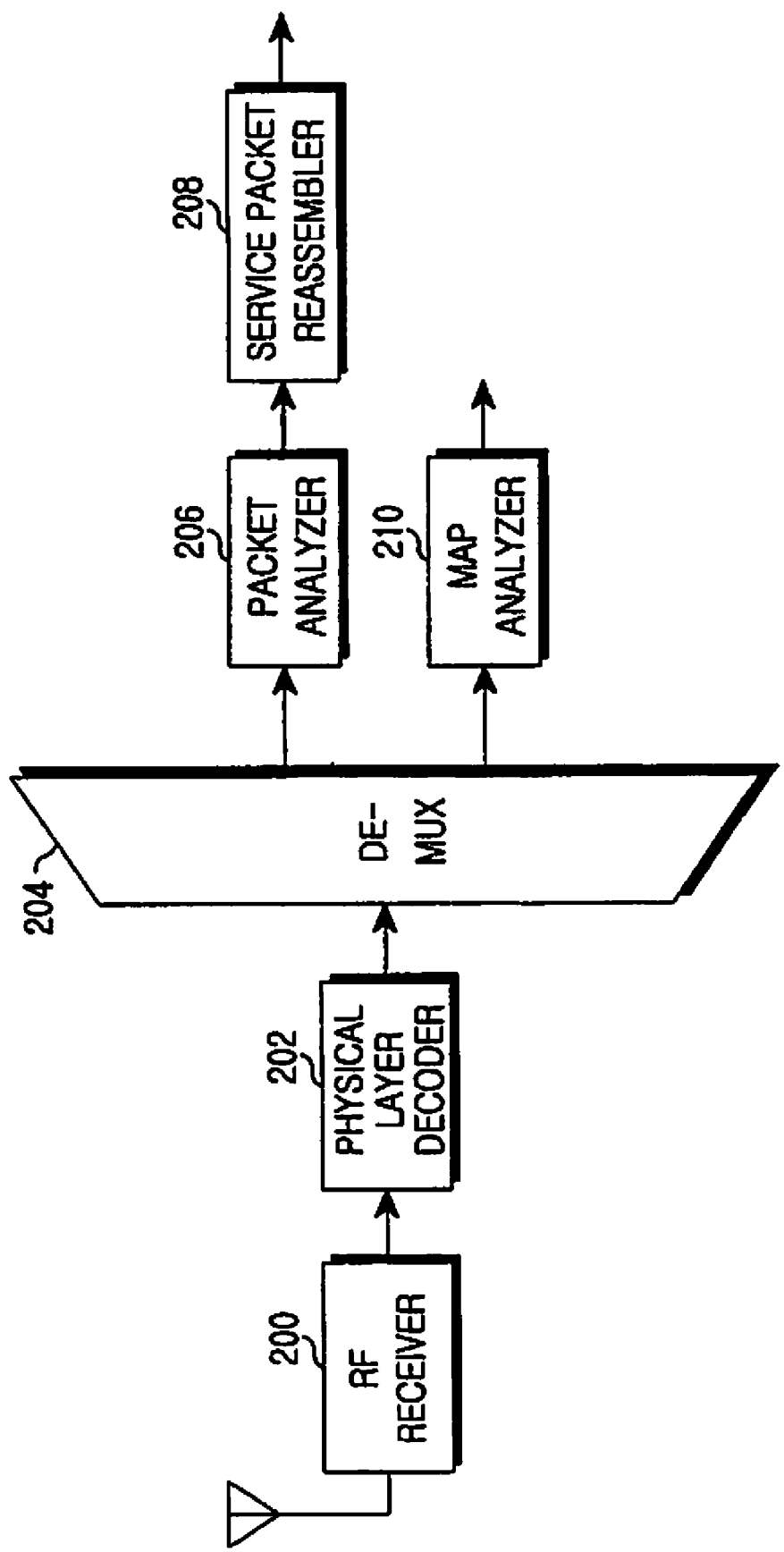
FIG. 2 is a block diagram of a terminal in the BWA system according to a preferred embodiment of the present invention.

FIG. 2 is a block diagram of a terminal in the BWA system according to a preferred embodiment of the present invention. The terminal includes an RF receiver 200, a physical layer decoder 202, a demultiplexer (DE-MUX) 204, a packet analyzer 206, a service packet reassembler 208, and a MAP analyzer 210.

The RF receiver 200 converts an RF signal received via an antenna to a baseband signal, and further converts the baseband analog signal to digital signal.

The physical layer decoder 202 acquires synchronization using the preamble signal received in the head of the frame, decodes the digital signal output from the RF receiver 200 in the physical layer, and forwards the packets to the DE-MUX 204. Herein, the physical layer decoder 202 may include a demodulating block, a channel decoding block, and so forth. Given the OFDM system, the demodulating block may include an FFT operator for extracting data of the subcarriers, and the channel decoding block may include a demodulator, a deinterleaver, and a channel decoder.

The DE-MUX 204 classifies the packets output from the physical layer decoder 202 according to a preset rule and provides the classified packets to the corresponding analyzer. The DE-MUX 204 outputs the packets received in a certain region of the start of the frame to the MAP analyzer 210, and outputs the other data packets received in the DL interval to the packet analyzer 206.

The packet analyzer 206 detects whether there is error in the data packets output from the DE-MUX 204 and outputs payloads by removing the header.

The service packet reassembler 208 assembles service packets, e.g., Service Data Unit (SDU), with the payloads output from the packet analyzer 206. The service packets are processed in the application layer.

The MAP analyzer 210 acquires the resource allocation information of the UL/DL packets by analyzing the packets output from the DE-MUX 204. In doing so, the MAP analyzer 210 acquires the resource allocation information of the circuit service to which the resource is periodically allocated in the frame interval. The terminal confirms the resource for carrying the DL packets and the resource for carrying the UL packets using the acquired resource allocation information.

Figure 3:
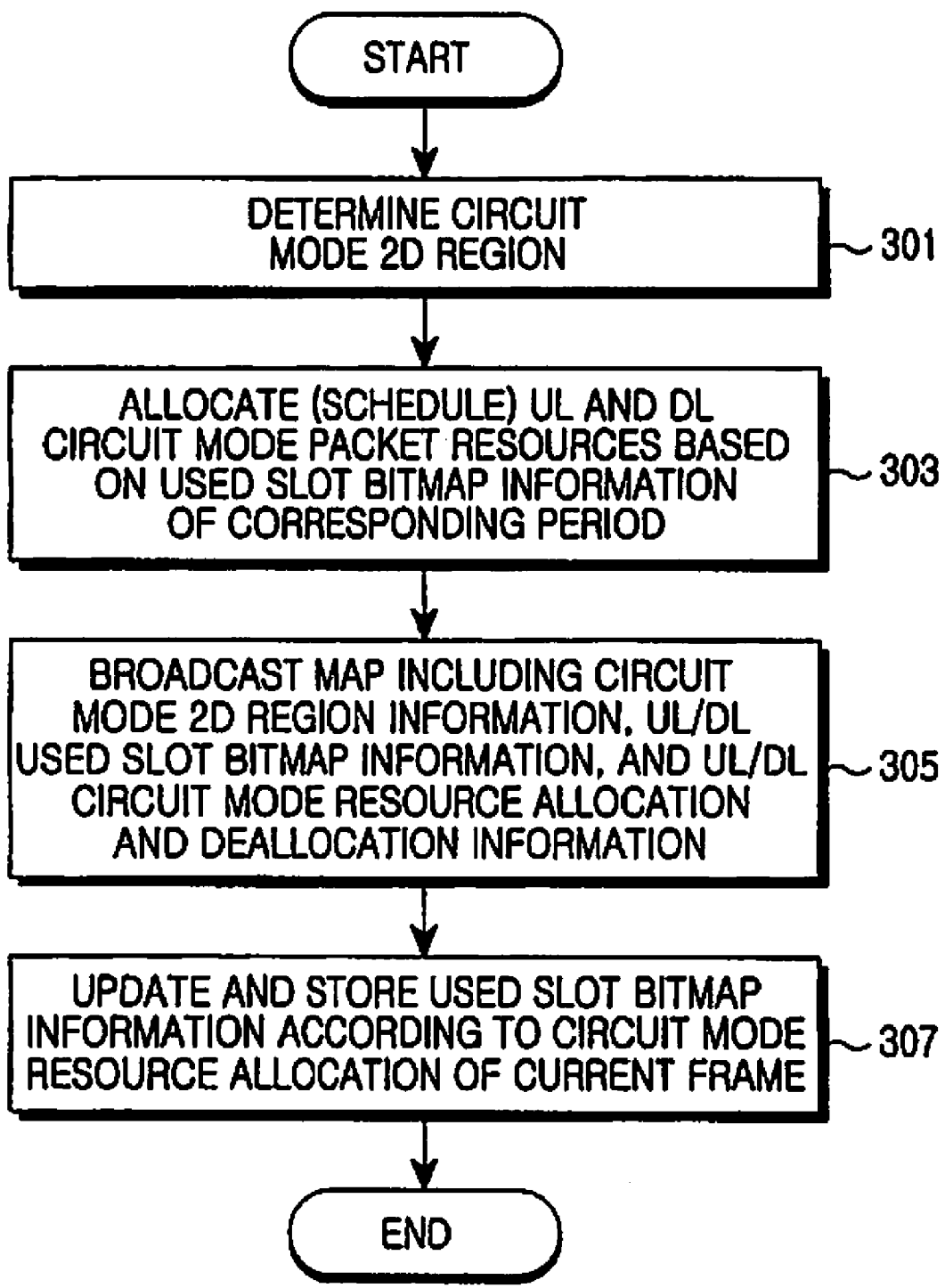
FIG. 3 is a flowchart illustrating a circuit mode resource allocating method of the base station in the BWA system according to a preferred embodiment of the present invention.

FIG. 3 is a flowchart illustrating a circuit mode resource allocating method of the base station in the BWA system according to a preferred embodiment of the present invention.

In step 301, the base station determines the circuit mode 2D region for the DL circuit mode packets of the current frame using the information relating to the entire circuit mode 2D region to which the DL circuit mode packets can be allocated.

In step 303, the base station allocates, or schedules, the resources for the DL circuit mode packets based on the currently used slot bitmap information of the corresponding period with respect to the determined circuit mode 2D region, and allocates resources for the UL circuit mode packets based on the used slot information of the corresponding period with respect to the UL circuit mode region. Herein, the currently used slot bitmap information indicates whether the current slot is used in the entire circuit mode region, using the bitmap. The currently used slot bitmap information is included to the circuit mode resource allocation message. The terminal makes the circuit mode connection based on the currently used slot bitmap information. For example, assuming that the number of the slots of the entire circuit mode 2D region is 32 in the DL, the terminal matches the slots to the bits of the used blot bitmap. When the n-th slot in the backward direction of the entire circuit mode 2D region is occupied, the n-th bit matched to the corresponding slot is represented by 1 in the used slot bitmap. On the other hand, when the n-th slot is not occupied, the n-th bit is represented by 0. Herein, the order of the matched bits can be changed later on. An unoccupied slot can be newly allocated to the terminal, the periodic resource allocation may be released for the slot allocated to and occupied by the terminal, and the position of the slot pre-allocated to the terminal may be changed due to the change of the determined circuit mode 2D region.

In step 305, the base station generates and broadcasts the MAP including the determined circuit mode 2D region information, the UL/DL used slot bitmap information, and the UL/DL circuit mode resource allocation and deallocation information of each slot.

The MAP includes the DL/UL circuit mode resource allocation message. The DL circuit mode resource allocation, i.e. CircuitMode_DL-MAP_IE( ) message, can be constructed as shown in Table 1.

TABLE 1

| Fields | Description |
| --- | --- |
| CircuitMode_DL-MAP_IE( ) { | |
|   DIUC | |
|   Length | |
|   .... | |
|   while(data remains) { | |
|     RegionID | 2D region identification. |
|     SymbolOffset | OFDMA symbol offset |
|     SubchOffset | subchannel offset |
|     NumSymbol | Number of OFDMA symbols |
|     NumSubch | Number of subchannels |
|     Compressed Used Slot Bitmap size | bytewise length of Compressed Used Slot Bitmap |

TABLE 1-continued

| Fields | Description |
|---|---|
| Compressed Used Slot Bitmap | DL Used Slot Bitmap (compressible using a specific algorithm) |
| .... | |
| N_Burst | number of DL circuit mode control messages |
| For(i=0; i<N_Burst; i++) { | |
|   CircuitMode_DL_Sub-Burst_IE( ) | DL circuit mode control message |
|   .... | |
|   } | |
| } | |

In Table 1, the Downlink Interval Usage Code (DIUC) field indicates a code used to distinguish an Information Element (IE) message included in the DL-MAP, and the Length field indicates a length of the DL circuit mode resource allocation message. The RegionID field is an IDentifier (ID) of the circuit mode 2D region. Since there can be multiple circuit mode 2D regions, the circuit mode terminal, receiving the DL circuit mode resource allocation message, confirms the RegionID of its circuit mode 2D region and then operates in the circuit mode in the corresponding region. SymbolOffset, NumSymbol, SubChOffset, and NumSubCh fields inform of the position and the size of the corresponding circuit mode 2D region in the symbol domain and the subchannel domain. The Compressed Used Slot Bitmap size field indicates a bytewise length of the compressed used slot bitmap, and the Compressed Used Slot Bitmap field indicates the used slot bitmap which informs whether the slots in the corresponding circuit mode 2D region are occupied. Note that the used slot bitmap can be compressed using a specific algorithm. The N_Burst field indicates the number of DL circuit mode control messages transmitted. There are DL circuit mode control, i.e. CircuitMode_DL_Sub-Burst_IE( ), messages as many as N_Burst. In the corresponding circuit mode 2D region, the DL circuit mode control message represents every message which controls the circuit mode to allocate the resource to the terminal, to change the allocated resource, and to deallocate the resource.

The DL circuit mode control message can be constructed as shown in Table 2.

TABLE 2

| Fields | Description |
|---|---|
| CircuitMode_DL_Sub-Burst_IE( ) { | |
|   Connection ID | identification of connection in circuit mode |
|   Mode | 0b00: circuit mode resource allocation |
| | 0b01: circuit mode resource change |
| | 0b10: circuit mode resource deallocation |
| | 0b11~: reserved |
|   if(Mode ==0b00 or 0b01) { | |
|     Slot Offset | start offset of slot allocated in circuit mode |
|     Duration | number of slots allocated in circuit mode |
|     Period | period of allocation of circuit mode slot |
|     Sub-Burst DIUC Indicator | 0: have the same DIUC and the same repetition as in previous sub-burst |
| | 1: set DICU and repetition |
|     if(Sub-Burst DIUCIndicator==1){ | |
|       DIUC | |
|       Repetition Coding Indication | 0b00: No repetition coding |
| | 0b01: Repetition coding of 2 used |
| | 0b10: Repetition coding of 4 used |
| | 0b11: Repetition coding of 6 used |
|     } | |
|     ACK disable | |
|     if(ACK disable == 0) { | |
|       ACKCH Index | index of channel carrying ACK for DL HARQ packets |
|     } | |
|     .... | |
|   } | |
| } | |

In Table 2, the Connection ID field indicates an ID of the connection in the circuit mode. Generally, the Connection ID field can employ a transport Connection ID (CID). The terminal of the corresponding connection performs the circuit mode operation according to the Mode as follows. The Mode field indicates the function of the corresponding control message. When the Mode field is 0b00, the circuit mode resource is allocated for the connection indicated by the Connection ID field. The Mode field of 0b01 indicates changing the circuit mode resource pre-allocated to the connection indicated by the Connection ID field. The Mode field of 0b10 indicates releasing the resource allocated to the connection indicated by the Connection ID field.

The following fields are effective only when the Mode field is 0b00 and 0b01: the Slot Offset field indicating the start offset of the slot allocated in the circuit mode, the Duration field indicating the number of slots allocated in the circuit mode, and the Period field indicating the period of the circuit mode slot allocation in the unit of the frame. In every period frame, the slot in the length from the Slot Offset to the Duration is allocated to the corresponding terminal. Further, the DL circuit mode control message includes information relating to the modulation and coding scheme of the circuit mode packets, i.e. the DIUC field and the Repetition Coding Indication field, and the HARQ ACK channel, i.e. the ACKCH Index field.

The UL circuit mode resource allocation (CircuitMode_UL-MAP_IE( )) message can be constructed as shown in Table 3.

TABLE 3

| Fields | Description |
| --- | --- |
| CircuitMode_UL-MAP_IE( ) { | |
| UIUC | |
| Length | |
| .... | |
| Compressed Used Slot Bitmap size | bytewise length of the Compressed Used Slot Bitmap |

In Table 3, the Uplink Interval Usage Code (UIUC) field indicates a code used to distinguish the IE message included in the UL-MAP, and the Length field indicates a length of the UL circuit mode resource allocation message. Since the circuit mode region is allocated only in one-dimension in the UI, information relating to the Region ID or the size and the position of the region is unnecessary. The Compressed Used Slot Bitmap Size field indicates a bytewise length of the Compressed Used Slot Bitmap, and the Compressed Used Slot Bitmap field is a used slot bitmap indicating whether the slots are occupied in the circuit mode region. The used slot bitmap can be compressed using a specific algorithm. The N_Burst field indicates the number of UL circuit mode control messages transmitted. There are UL circuit mode control, i.e. CircuitMode_UL_Sub-Burst_IE( ), messages as many as N_Burst. In the corresponding circuit mode region, the UL circuit mode control message represents every message which controls the circuit mode to allocate the resource to the terminal, to change the allocated resource, and to deallocate the resource.

The UL circuit mode control message can be constructed as shown in Table 4.

TABLE 4

| Fields | Description |
| --- | --- |
| CircuitMode_UL_Sub-Burst_IE( ) { | |
| Connection ID | identification of connection in circuit mode |
| Mode | 0b00: circuit mode resource allocation |
| | 0b01: circuit mode resource change |
| | 0b10: circuit mode resource deallocation |
| | 0b11~: reserved |
| if(Mode ==0b00 or 0b01) { | |
| Slot Offset | start offset of slot allocated in circuit mode |
| Duration | number of slots allocated in circuit mode |
| Period | period of circuit mode slot allocation |
| Sub-Burst UIUC Indicator | 0: have the same UIUC and the same repetition as in the previous sub-burst |
| | 1: set UIUC and repetition |
| if(Sub-Burst UIUCIndicator==1){ | |
| UIUC | |
| Repetition Coding Indication | 0b00: No repetition coding |
| | 0b01: Repetition coding of 2 used |
| | 0b10: Repetition coding of 4 used |
| | 0b11: Repetition coding of 6 used |
| } | |
| ACK disable | |
| if(ACK disable == 0) { | |
| UL ACK Bitmap Index | ACK/NACK bit index in ACK bitmap of UL HARQ packets |
| } | |
| .... | |
| } | |
| } | |

TABLE 3-continued

| Fields | Description |
| --- | --- |
| Compressed Used Slot Bitmap | UL Used Slot Bitmap (compressible using a specific algorithm) |
| .... | |
| N_Burst | number of UL circuit mode control messages |
| For(i=0; i<N_Burst; i++) { | |
| CircuitMode_UL_Sub-Burst_IE( ) | UL circuit mode control message |
| .... | |
| } | |
| } | |

The circuit mode related information in the UL of Table 4 is the same as the circuit mode related information of the DL circuit mode control message shown in Table 2. Notably, instead of the HARQ ACK channel, UL ACK/NACK bit index is included in the ACK bitmap of the UL HARQ packets.

In step 307, the base station updates the currently used slot bitmap information according to the circuit mode resource allocation of the current frame, and stores the updated currently used slot bitmap information. Next, the base station finishes this process. The base station transmits the DL circuit mode packets to the corresponding circuit mode terminal according to the circuit mode resource allocation. In response to the DL circuit mode packets, a HARQ response signal (ACK/NACK) can be fed back to the base station from the circuit mode terminal.

Figure 4:
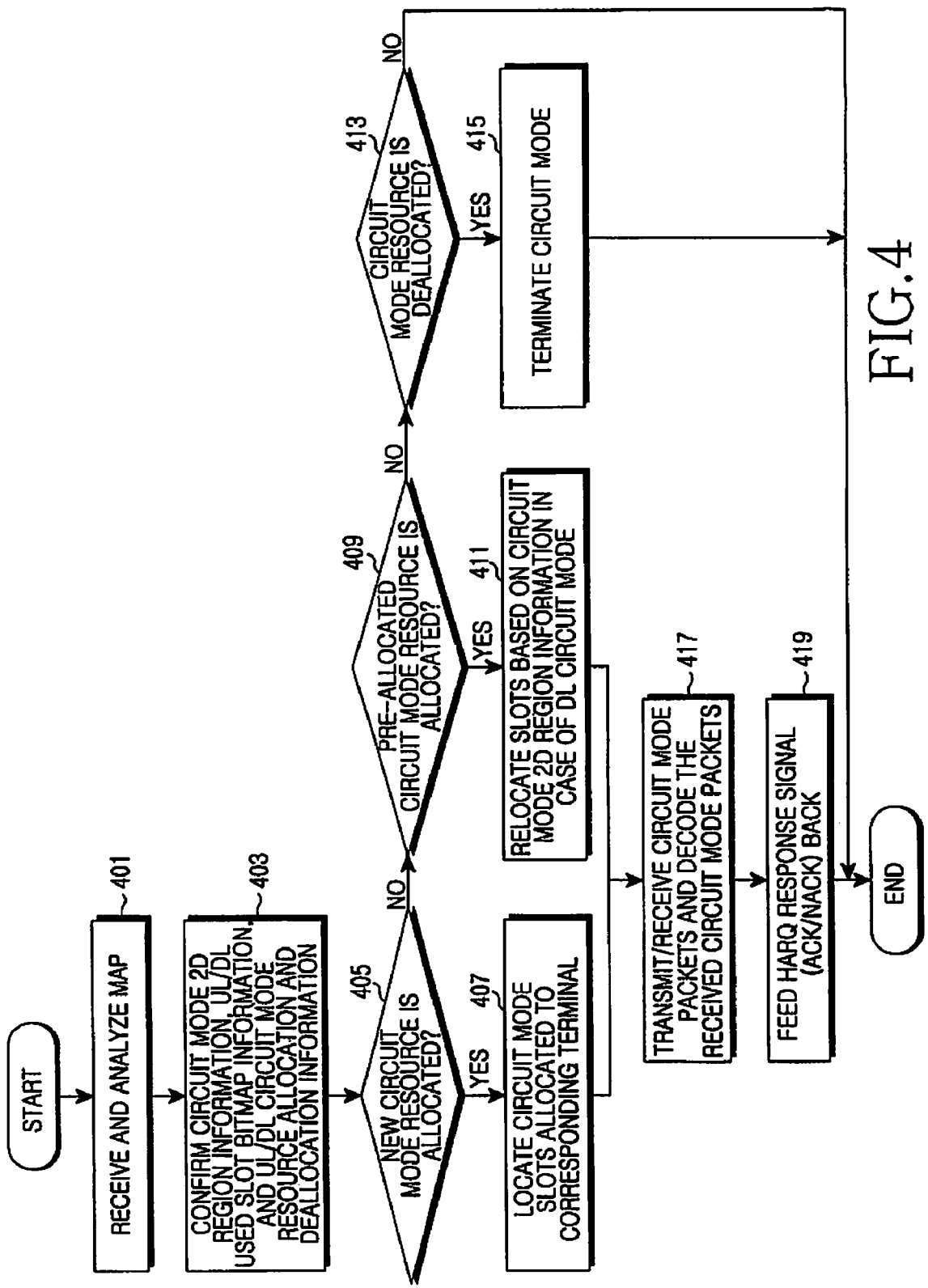
FIG. 4 is a flowchart illustrating a circuit mode resource allocation information receiving method of the terminal in the BWA system according to a preferred embodiment of the present invention.

FIG. 4 is a flowchart illustrating a circuit mode resource allocation information receiving method of the terminal in the BWA system according to a preferred embodiment of the present invention.

In step 401, the terminal receives the MAP from the base station in the DL and analyzes the received MAP. In step 403, the terminal confirms the circuit mode 2D region information, the UL/DL used slot bitmap information, and the UL/DL circuit mode resource allocation and deallocation information by analyzing the MAP. Hence, the terminal can acquire whether there is a resource allocated to itself in the circuit mode.

In step 405, the terminals checks whether a new circuit mode resource is allocated based on the UL/DL circuit mode resource allocation and deallocation information. When the new circuit mode resource is allocated, the terminal confirms the start offset of the allocated slots, the number of the allocated slots, and the slot allocation period information from the UL/DL circuit mode resource allocation and deallocation information, and locates its allocated circuit mode slots using the circuit mode 2D region information and the UL/DL used slot bitmap information in step 407. That is, in the DL, the terminal confirms the corresponding circuit mode 2D region using the circuit mode 2D region information and the currently used slots and the unused slots using the currently used slot bitmap information of the corresponding circuit mode 2D region. The terminal acquires as many slots as the slots allocated from the start slot in the backward direction of the corresponding region with respect to the unused slots in the corresponding circuit mode 2D region be assigned to the terminal during the allocation period. In the UL, the terminal confirms the currently used slots and the unused slots using the currently used slot bitmap information, and acquires as many slots as the slots allocated from the start slot in the backward direction of the corresponding region with respect to the unused slots in the UL circuit mode region be assigned to the terminal during the allocation period.

In step 417, the terminal transmits and receives the circuit mode packets through the allocated circuit mode resource. When receiving the DL circuit mode packets, the terminal decodes the received DL circuit mode packets.

In step 419, the terminal generates a HARQ response signal, i.e. Acknowledgment/Negative Acknowledgment (ACK/NACK), for the received DL circuit mode packets and feeds the HARQ response signal to the base station.

By contrast, when the new circuit mode resource is not allocated in step 405, the terminal checks whether the pre-allocated circuit mode resource is allocated in step 409. When the pre-allocated circuit mode resource is allocated, the terminal relocates its allocated slots based on the circuit mode 2D region information in case of the DL circuit mode in step 411 and then goes to step 417.

By contrast, when the pre-allocated circuit mode resource is not allocated in step 409, the terminal checks whether the circuit mode resource is deallocated in step 413. When the circuit mode resource is deallocated, the terminal ends the circuit mode in step 415 and finishes this process. When the circuit mode resource is not deallocated, the terminal recognizes that it is not operating in the circuit mode and then finishes this process.

Figure 5:
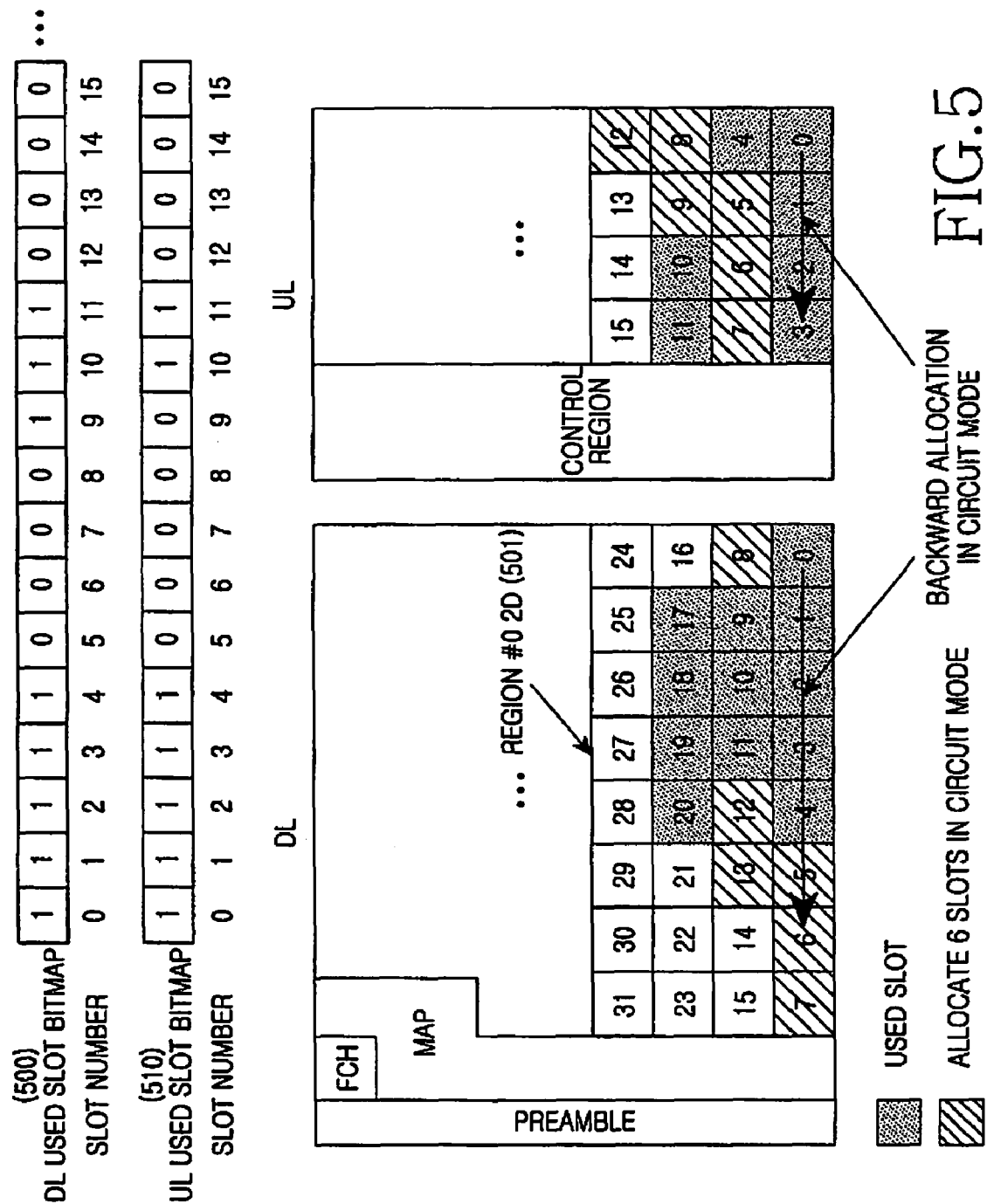
FIG. 5 is a diagram illustrating the circuit mode resource allocation information receiving method of the terminal in the BWA system according to a preferred embodiment of the present invention.

FIG. 5 is a diagram illustrating the circuit mode resource allocation information receiving method of the terminal in the BWA system according to an exemplary embodiment of the present invention.

Every terminal can check whether there is a resource allocated to itself in the circuit mode based on the DL circuit mode resource allocation message of the MAP. It is assumed that a specific terminal is allocated six slots from the offset 5 slot by 5-frame periods through the DL circuit mode resource allocation message, in the circuit mode 2D region of the region ID #0. The terminal can acquire that its circuit mode 2D region is the region #0 2D region 501 based on the region ID, and that the slots 0~4 and 9~11 are currently used based on the DL used slot bitmap 500 of the region #0 2D region 501. Accordingly, the terminal can acquire that its allocated six slots are the slots 5~8, 12 and 13 by checking whether the offset 5 slot is used in the backward direction of the region #0 2D region 501. Next, the terminal confirms the 2D region using the region information of the region #0 2D region 501 in the DL circuit mode resource allocation message by 5-frame periods, and occupies the slots 5~8, 12 and 13 starting from the offset 5 slot of the corresponding 2D region.

Likewise, every other terminal can check whether there is a resource allocated to itself in the circuit mode, based on the UL circuit mode resource allocation message of the MAP. In FIG. 5, it is assumed that a specific terminal is assigned six slots starting from the offset 5 slot by 5-frame periods through the UL circuit mode resource allocation message. The specific terminal can confirm the UL used slot bitmap 510 through the UL circuit mode resource allocation message. According to the UL used slot bitmap 510, the slots 0~4, 10 and 11 are currently in use. Hence, the terminal can acquire that its allocated six slots are the slots 5~9 and 12 by checking whether the slots from the offset 5 slot in the backward direction from the end of the UL region are occupied. Next, the terminal occupies the slots 5~9 and 12 starting from the offset 5 slot based on the end of the UL region by 5-frame periods.

While the backward slot allocation in the time domain (the OFDMA symbol axis) has been illustrated by way of example, the present invention is applicable to the forward slot allocation in the time domain (the OFDMA symbol axis), the backward slot allocation in the frequency domain, and the forward slot allocation in the frequency domain.

As set forth above, the apparatus and the method for the circuit mode resource allocation in the BWA system can achieve the effective circuit mode resource allocation without holes in the circuit mode, while maintaining the backward compatibility with the existing standards.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method for a periodic resource allocation of a base station in a Broadband Wireless Access (BWA) system comprising:

generating, by a MAP generator, a first resource allocation message which comprises currently used slot bitmap information with respect to a circuit mode region in a frame;

allocating, by a scheduler, resources to one or more terminals with respect to currently unused slots in the circuit mode region according to the currently used slot bitmap information; and generating, by the MAP generator, a second resource allocation message which comprises information relating to the resource allocation, wherein the currently used slot bitmap information indicates whether each slot in the circuit mode region is used.

2. The method of claim 1, further comprising:
transmitting the first resource allocation message and the second resource allocation message to the one or more terminals.

3. The method of claim 1, further comprising:
updating the used slot bitmap information according to the resource allocation.

4. The method of claim 1, wherein, in a downlink, the circuit mode region is a two-dimensional (2D) region, and the resource allocation allocates slots to the one or more terminals in one dimension within the 2D region 5. The method of claim 4, wherein, in an uplink, the resource allocation allocates slots to the one or more terminals in one dimension within the circuit mode region.

6. The method of claim 4, wherein the first resource allocation message for the downlink comprises at least one of an IDentifier (ID) of the 2D region, location information of the 2D region, size information of the 2D region, the used slot bitmap information, length information of a compressed used slot bitmap, and information relating to the number of the second resource allocation messages.

7. The method of claim 5, wherein the first resource allocation message for the uplink comprises at least one of the currently used slot bitmap information, length information of a compressed used slot bitmap, and information relating to the number of the second resource allocation messages.

8. The method of claim 1, wherein the second resource allocation message comprises at least one of a connection ID, mode information indicating whether the second resource allocation message instructs to allocate a periodic resource to a corresponding connection, to change a pre-allocated resource, or to deallocate a resource, information relating to the number of allocated slots, and allocation period information.

9. The method of claim 8, wherein the second resource allocation message further comprises start offset information of the allocated slots.

10. The method of claim 8, wherein the second resource allocation message for the downlink further comprises at least one of modulation and coding scheme information of circuit mode packets and Acknowledgement (ACK) channel index information of Hybrid Automatic Repeat reQuest (HARQ) packets, and
the second resource allocation message for the uplink further comprises at least one of modulation and coding scheme information of circuit mode packets and ACK/NACK bit index information in an ACK bitmap of HARQ packets.

11. The method of claim 1, wherein the resource is allocated in one of a backward direction in a time domain, a forward direction in the time domain, a backward direction in a frequency domain, and a forward direction in the frequency domain, within the circuit mode region.

12. The method of claim 1, further comprising:
changing a resource pre-allocated to a terminal or releasing a resource allocated to a terminal,
wherein the second resource allocation message comprises information relating to change of the pre-allocated resource or information relating to deallocation of the resource.

13. A method for a periodic resource allocation to a terminal in a Broadband Wireless Access (BWA) system comprising:
receiving a first resource allocation message which comprises a currently used slot bitmap information of a circuit mode region in a frame;
receiving a second resource allocation message which comprises resource allocation information; and
locating a resource allocated to the terminal using the currently used slot bitmap information and the resource allocation information with respect to currently unused slots in the circuit mode region,
wherein the currently used slot bitmap information indicates whether each slot in the circuit mode region is used.

14. The method of claim 13, wherein, in a downlink, the circuit mode region is a two-dimensional (2D) region, and the resource allocation information is information relating to the resource allocated to the terminal in one dimension in the 2D region.

15. The method of claim 14, wherein, in an uplink, the resource allocation information is information relating to the resource allocated to the terminal in one dimension within the circuit mode region.

16. The method of claim 14, wherein the first resource allocation message for the downlink comprises at least one of an IDentifier (ID) of the 2D region, location information of the 2D region, size information of the 2D region, the currently used slot bitmap information, length information of a compressed used slot bitmap, and information relating to the number of the second resource allocation messages.

17. The method of claim 15, wherein the first resource allocation message for the uplink comprises at least one of the currently used slot bitmap information, length information of a compressed used slot bitmap, and information relating to the number of the second resource allocation messages.

18. The method of claim 13, wherein the second resource allocation message comprises at least one of a connection ID, mode information indicating whether the second resource allocation message instructs to allocate a periodic resource to a corresponding connection, to change a pre-allocated resource, or to deallocate a resource, information relating to the number of allocated slots, and allocation period information.

19. The method of claim 18, wherein the second resource allocation message further comprises start offset information of the allocated slots.

20. The method of claim 18, wherein the second resource allocation message for the downlink further comprises at least one of modulation and coding scheme information of circuit mode packets and Acknowledgement (ACK) channel index information of Hybrid Automatic Repeat reQuest (HARQ) packets, and
the second resource allocation message for the uplink further comprises at least one of modulation and coding scheme information of circuit mode packets and Acknowledgement/Negative Acknowledgement (ACK/NACK) bit index information in an ACK bitmap of HARQ packets.

21. The method of claim 13, wherein the locating of the allocated resource confirms slots as many as the number of the allocated slots starting from the start offset slot in one of a backward direction in a time domain, a forward direction in the time domain, a backward direction in a frequency domain, and a forward direction in the frequency domain, within the circuit mode region, with respect to currently unused slots in the circuit mode region.

22. The method of claim 13, further comprising:
transmitting and receiving circuit mode packets using the allocated resource.

23. The method of claim 13, further comprising:
when receiving a second resource allocation message comprising change information of a resource pre-allocated to the terminal, locating the changed resource; and
transmitting and receiving circuit mode packets using the changed resource.

24. The method of claim 13, further comprising:
when receiving a second resource allocation message comprising deallocation information of a resource pre-allocated to the terminal, terminating circuit mode packet transmission and reception using the corresponding resource.

25. An apparatus for periodic resource allocation of a base station in a Broadband Wireless Access (BWA) system comprising:
a scheduler forallocating resources to one or more terminals with respect to currently unused slots in a circuit mode region according to currently used slot bitmap information of the circuit mode region in a frame; and
a MAP generator for generating a first resource allocation message which comprises the currently used slot bitmap information and a second resource allocation message which comprises information relating to the resource allocation,
wherein the currently used slot bitmap information indicates whether each slot in the circuit mode region is used
wherein the MAP means resource allocation information to indicate data burst transmitted in the current frame.

26. The apparatus of claim 25, further comprising:
a physical layer encoder for encoding the first resource allocation message and the second resource allocation message in a physical layer; and
a Radio Frequency (RF) transmitter for converting signals output from the physical layer encoder to RF signals and transmitting the RF signals over an antenna.

27. The apparatus of claim 25, wherein the scheduler updates the currently used slot bitmap information according to the resource allocation.

28. The apparatus of claim 25, wherein, in a downlink, the circuit mode region is a two-dimensional (2D) region, and
the scheduler allocates slots to the one or more terminals in one dimension within the 2D region.

29. The apparatus of claim 28, wherein, in an uplink, the scheduler allocates slots to the one or more terminals in one dimension within the circuit mode region.

30. The apparatus of claim 28, wherein the first resource allocation message for the downlink comprises at least one of an IDentifier (ID) of the 2D region, location information of the 2D region, size information of the 2D region, the currently used slot bitmap information, length information of a compressed used slot bitmap, and information relating to the number of the second resource allocation messages.

31. The apparatus of claim 29, wherein the first resource allocation message for the uplink comprises at least one of the currently used slot bitmap information, length information of a compressed used slot bitmap, and information relating to the number of the second resource allocation messages.

32. The apparatus of claim 25, wherein the second resource allocation message comprises at least one of a connection ID, mode information indicating whether the second resource allocation message instructs to allocate a periodic resource to a corresponding connection, to change a pre-allocated resource, or to deallocate a resource, information relating to the number of allocated slots, and allocation period information.

33. The apparatus of claim 32, wherein the second resource allocation message further comprises start offset information of the allocated slots.

34. The apparatus of claim 32, wherein the second resource allocation message for the downlink further comprises at least one of modulation and coding scheme information of circuit mode packets and Acknowledgement (ACK) channel index information of Hybrid Automatic Repeat reQuest (HARQ) packets, and
the second resource allocation message for the uplink further comprises at least one of modulation and coding scheme information of circuit mode packets and Acknowledgement/Negative Acknowledgement (ACK/NACK) bit index information in an ACK bitmap of HARQ packets.

35. The apparatus of claim 25, wherein the scheduler allocates the resource in one of a backward direction in a time domain, a forward direction in the time domain, a backward direction in a frequency domain, and a forward direction in the frequency domain, within the circuit mode region.

36. The apparatus of claim 25, wherein the scheduler changes a resource pre-allocated to a terminal or releases a resource allocated to a terminal,
wherein the second resource allocation message comprises information relating to change of the pre-allocated resource or information relating to deallocation of the resource.

37. An apparatus for periodic resource allocation to a terminal in a Broadband Wireless Access (BWA) system comprising:
a Radio Frequency (RF) receiver for converting a signal received via an antenna to a baseband signal;
a physical layer decoder for converting the signal output from the RF receiver in a physical layer; and
a MAP analyzer for receiving a first resource allocation message which comprises a currently used slot bitmap information of a circuit mode region in a frame, and a second resource allocation message which comprises resource allocation information through the physical layer decoder, and locating a resource allocated to the terminal using the currently used slot bitmap information and the resource allocation information with respect to currently unused slots in the circuit mode region,
wherein the currently used slot bitmap information indicates whether each slot in the circuit mode region is used,
wherein the MAP means resource allocation information to indicate data burst transmitted in the current frame.

38. The apparatus of claim 37, wherein, in a downlink, the circuit mode region is a two-dimensional (2D) region, and the resource allocation information is information relating to the resource allocated to the terminal in one dimension in the 2D region.

39. The apparatus of claim 38, wherein, in an uplink, the resource allocation information is information relating to the resource allocated to the terminal in one dimension within the circuit mode region.

40. The apparatus of claim 38, wherein the first resource allocation message for the downlink comprises at least one of an IDentifier (ID) of the 2D region, location information of the 2D region, size information of the 2D region, the currently used slot bitmap information, length information of a compressed used slot bitmap, and information relating to the number of the second resource allocation messages.

41. The apparatus of claim 39, wherein the first resource allocation message for the uplink comprises at least one of the currently used slot bitmap information, length information of a compressed used slot bitmap, and information relating to the number of the second resource allocation messages.

42. The apparatus of claim 37, wherein the second resource allocation message comprises at least one of a connection ID, mode information indicating whether the second resource allocation message instructs to allocate a periodic resource to a corresponding connection, to change a pre-allocated resource, or to deallocate a resource, information relating to the number of allocated slots, and allocation period information.

43. The apparatus of claim 42, wherein the second resource allocation message further comprises start offset information of the allocated slots.

44. The apparatus of claim 42, wherein the second resource allocation message for the downlink further comprises at least one of modulation and coding scheme information of circuit mode packets and Acknowledgement (ACK) channel index information of Hybrid Automatic Repeat reQuest (HARQ) packets, and the second resource allocation message for the uplink further comprises at least one of modulation and coding scheme information of circuit mode packets and Acknowledgement/Negative Acknowledgement (ACK/NACK) bit index information in an ACK bitmap of HARQ packets.

45. The apparatus of claim 37, wherein the MAP analyzer locates the resource allocated to the terminal by confirming slots as many as the number of the allocated slots starting from the start offset slot in one of a backward direction in a time domain, a forward direction in the time domain, a backward direction in a frequency domain, and a forward direction in the frequency domain, within the circuit mode region, with respect to currently unused slots in the circuit mode region.

46. The apparatus of claim 37, wherein the MAP analyzer controls transmission and reception of circuit mode packets using the allocated resource.

47. The apparatus of claim 37, wherein the MAP analyzer, when receiving a second resource allocation message comprising change information of a resource pre-allocated to the terminal, locates the changed resource and controls transmission and reception of circuit mode packets using the changed resource.

48. The apparatus of claim 37, wherein the MAP analyzer, when receiving a second resource allocation message comprising deallocation information of a resource pre-allocated to the terminal, controls to terminate circuit mode packet transmission and reception using the corresponding resource.

* * * * *